United States Patent [19]

Miller

[11] 4,051,717

[45] Oct. 4, 1977

[54] TESTING SHAFT SEALS WITHOUT PRESSURING SYSTEM TO OPERATING PRESSURE

[75] Inventor: J. B. Miller, Houston, Tex.

[73] Assignee: Phillips Petroleum Company, Bartlesville, Okla.

[21] Appl. No.: 678,857

[22] Filed: Apr. 21, 1976

[51] Int. Cl.² ............................................. G01M 3/08
[52] U.S. Cl. ...................................................... 73/46
[58] Field of Search ............................ 73/46, 49.8, 40

[56] References Cited

U.S. PATENT DOCUMENTS

| | | | |
|---|---|---|---|
| 2,467,960 | 4/1949 | Brady, Jr. | 286/11 |
| 2,951,363 | 9/1960 | Diodene | 73/40.5 R |
| 3,180,135 | 4/1965 | Cain, Jr. et al. | 73/46 |
| 3,375,015 | 3/1968 | Swearingen | 73/46 X |
| 3,405,109 | 10/1968 | Rohlfing | 260/88.2 |
| 3,872,713 | 3/1975 | Ilfrey et al. | 73/40.5 R |

*Primary Examiner*—Richard C. Queisser
*Assistant Examiner*—Joseph W. Roskos

[57] ABSTRACT

A seal on a rotatable shaft normally having high pressure sealant liquid behind same with a volatile fluid such as a monomer or light hydrocarbon diluent under high pressure being passed along an annulus in front of same, which annulus terminates in a pressurized vessel, is tested as follows. Before pressuring up the vessel, lubricant liquid under low pressure is passed through the annulus and the shaft is operated for a short time. The bearings are then inspected for vibration, smoking or a surge of sealant liquid along the annulus which would indicate seal failure. This is of particular utility in testing seals on pumps in olefin polymerization reactors.

13 Claims, 2 Drawing Figures

4,051,717

TESTING SHAFT SEALS WITHOUT PRESSURING SYSTEM TO OPERATING PRESSURE

BACKGROUND OF THE INVENTION

This invention relates to testing seals on a shaft without the necessity for pressuring the system to operating pressure.

Installation of mechanical seals on the shafts of such rotating machines as high speed pumps is a delicate job requiring particular attention to cleanliness, alignment and other details. It is not uncommon, however, for a new mechanical seal to fail during the first few minutes of use in spite of all precautions taken during its installation. Such an occurrence requires pulling the pump and replacement of the seal. This can be a costly and time-consuming procedure when the pump is located within a polymerization reactor, or other such vessel, which may contain several thousand gallons of material such as hydrocarbon fluid in the case of a polymerization reactor. In such an event, the reactor must be drained and purged of all hydrocarbon so the reactor may be safely opened. After seal replacement, the reactor must be dried and thoroughly purged with an inert gas (water and oxygen are catalyst poisons) and the reactor refilled. This entire procedure may require up to three days of reactor down time and considerable polymer production is lost if it should be that the seal fails and the procedure has to be repeated.

SUMMARY OF THE INVENTION

It is an object of this invention to test a shaft seal without the necessity for pressuring the system up to operating pressure;

it is a further object of this invention to reduce down time when changing seals; and it is yet a further object of this invention to provide an improved method of returning a polymerization reactor to operating conditions after replacing seals around the pump shaft.

In accordance with this invention, liquid at a low pressure is introduced into an annulus between a shaft and a surrounding sleeve and passed through a downstream bearing and out to the atmosphere while maintaining normal operating pressure on a sealant liquid behind a seal upstream from said point of inroduction, and thereafter operating the shaft for a short time at essentially operating speed.

BRIEF DESCRIPTION OF THE DRAWINGS

In the drawings, forming a part hereof, wherein like reference characters denote like parts in the various views.

DESCRIPTION OF THE PREFERRED EMBODIMENTS

The procedure of this invention is applicable to any shaft having a surrounding seal and is particularly applicable to pumps utilizing a double mechanical seal which requires an internal thrust bearing for shaft support. The invention is ideally suited for testing pumps utilizing a high speed impeller shaft (greater than 1000 rpm) such as the circulating pump for a pipe loop reactor as disclosed in U.S. Pat. No. 3,405,109 the disclosure of which is hereby incorporated by reference.

The procedure of this invention is also useful for single mechanical seals used in conjunction with an external packing gland so that the external seal face is pressured with a fluid for lubrication and cooling.

In the preferred embodiment, the testing is done with the pump and seal fully assembled and mounted and the reactor either open or closed as desired, but in any event, with the reactor not containing the reaction mixture. Thus, the downstream end of the pump assembly is opened to the atmosphere if the pump is open or even if the pump is closed, it is open to the atmosphere within the meaning set forth in this application, since there is no need for pressure within the reactor.

The sealant liquid for pressuring the seal and the lubricant liquid passed through the annulus may be the same or they may be different liquids. If they are the same, they may be provided from a common source or, if desired, from separate sources. These liquids are preferably highly refined white mineral oils, but any clean fluid which is relatively non-volatile at atmospheric pressure and about room temperature, has lubricating properties, and is free or nearly free of reactor poisons may be used. For example, refined kerosene or heavy hydrocarbon solvent could be utilized. Also, silicone lubricants can be utilized as well as the newly developed synthetic hydrocarbon lubricants. It is essential that the lubricant liquid be such that it will not volatilize under test conditions, which is the reason a portion of the sealant liquid or other such liquid lubricant is employed instead of the monomer (ethylene, propylene, butene and the like) or the diluent (butanes, normal pentane, normal hexane, isohexane, cyclohexane, and the like) which is normally passed through the annulus during actual operation of a polymerization reactor.

Figure 1:
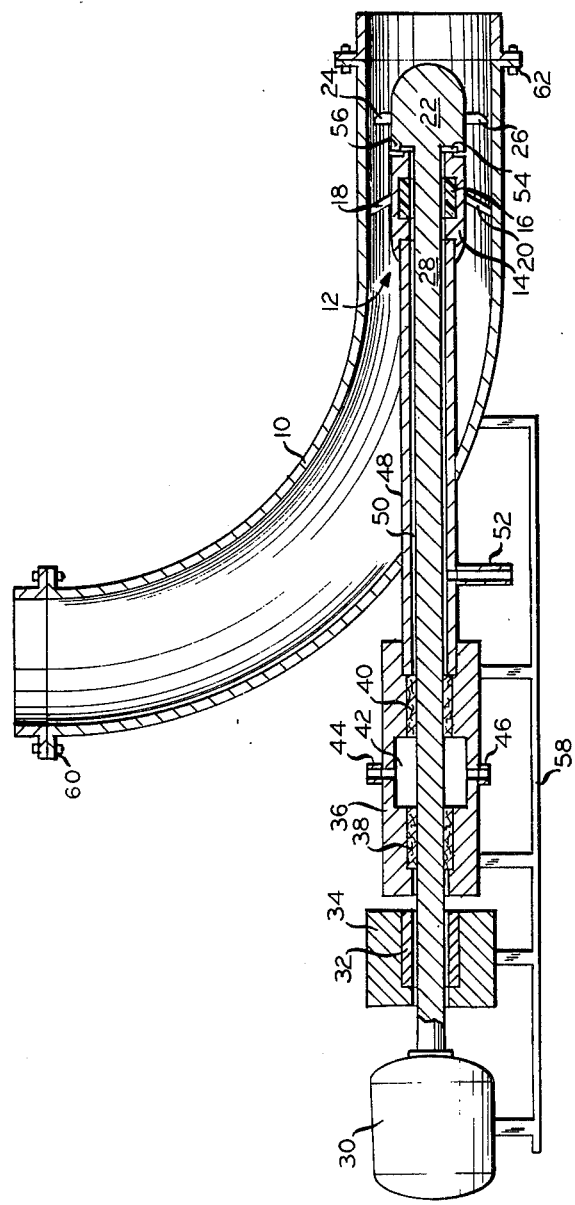
FIG. 1 is a view in cross section of a motor driven impeller for a pipe loop polymerization reactor employing seals to be tested in accordance with this invention.

Referring now to the drawings, particularly FIG. 1, there is shown a portion of a pipe loop olefin polymerization reactor 10 having therein an impeller assembly 12. Impeller assembly 12 comprises an impeller housing 14 carrying a shaft sleeve bearing 16. Shaft sleeve bearing 16 may be of a metallic alloy such as those utilized for main and rod bearings in automobile engines but is preferably made of a self-lubricating plastic having good high temperature properties such as Ryton (trademark) polyphenylene sulfide. Impeller assembly 12 is supported within reactor 10 by means of spider member 18 and 20. Impeller hub 22 carries blade members 24 and 26 and is fixedly attached to shaft 28 which is driven by motor 30. Shaft 28 is supported at the upstream end thereof by means of thrust bearing 32, which can be any conventional thrust bearing of the types well known in the art. Thrust bearing 32 is carried by thrust bearing housing 34. Seal housing 36 carries upstream and downstream mechanical seals 38 and 40, respectively. Between mechanical seals 38 and 40 is sealant chamber 42. Sealant liquid is passed through sealant chamber 42 by means of entry conduit 44 and exit conduit 46.

Connecting impeller housing 14 and seal housing 36 is sleeve 48. Between the outer surface of shaft 28 and the inner surface of sleeve 48 is annular passageway 50. At an upstream end thereof but downstream from seal 40 is entry conduit 52 which serves as a flush entry conduit during normal operation of the impeller pump and as lubricant liquid entry conduit during the test procedure. Annulus 50 extends from the downstream seal 40 through shaft sleeve bearing 16 terminating at hub 22. A generally radial conduit 54 is provided to connect annular passageway 50 with the atmosphere or interior of the reactor. A skirt or flange 56 on the upstream end of hub 22 surrounds the forward end of impeller housing 14. Thus, there is a completed passageway via conduit 52, annular passageway 50, and generally radial passageway 54 for passage of flush fluid such as monomer or diluent during the normal operation of the reactor and for the passage of lubricant liquid during the test procedure of this invention as will be described in detail hereinafter.

Frame 58, which supports the motor, thrust bearing housing, seal housing, and pipe loop reactor is shown schematically. The portion of the pipe loop reactor 10 containing the impeller assembly can be separated from the rest of the reactor by unbolting flanges 60 and 62, respectively.

Figure 2:
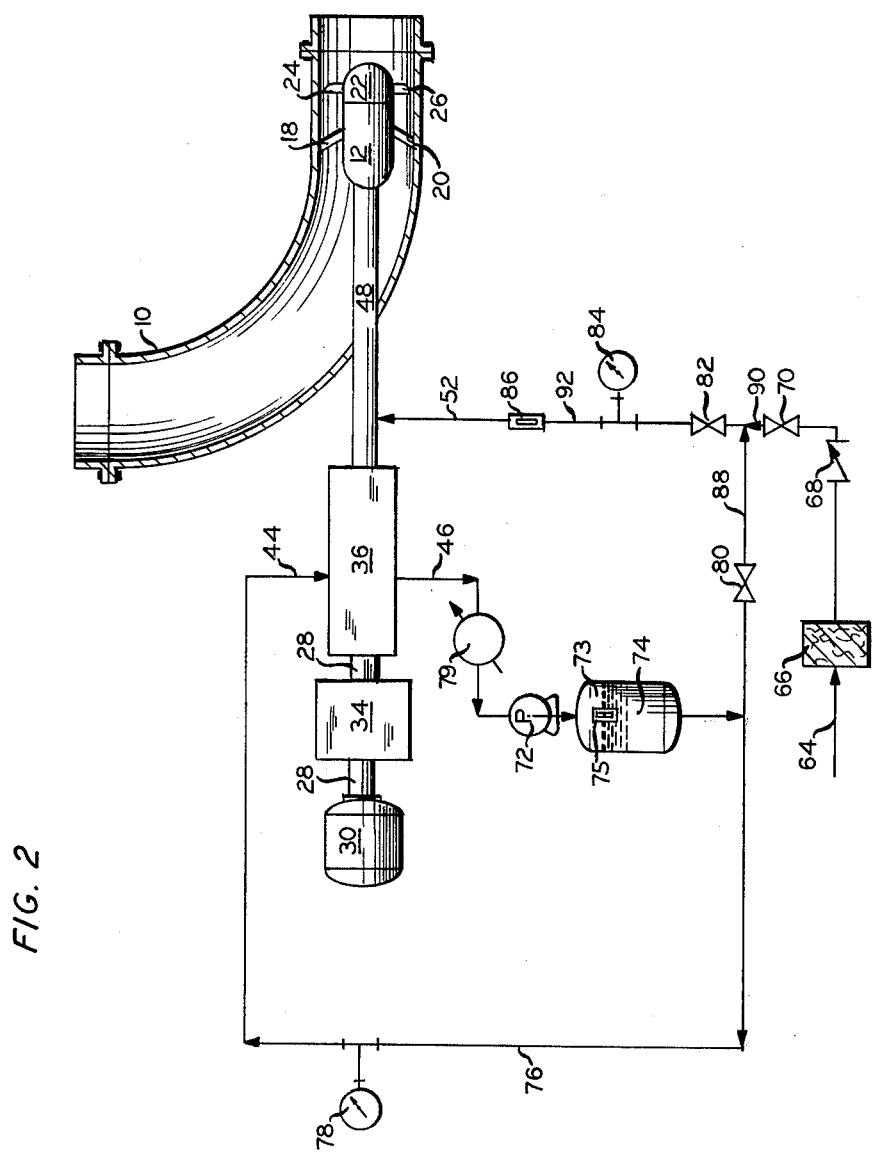
FIG. 2 is a schematic representation of the lubricant and sealing system connections for effecting testing of the seals.

Referring now to FIG. 2, there is shown in schematic form the equipment required for the test procedure of this invention.

Flush fluid such as propylene monomer or isobutane diluent or the like is introduced via line 64 during normal operation of the apparatus and passes through filter 66 and check valve 68.

When it is necessary to replace any of the bearings or seals, the reactor is emptied of its contents, and, of course, the flow of monomer or diluent flush is shut off by closing valve 70.

After the repairs have been made, the seals are tested prior to pressuring up the reactor in accordance with the invention as follows: Pump 72 is activated, which pumps sealant liquid such as mineral oil preferably from storage reservoir 74 via line 76 which connects with line 44 to give full operating pressure in cavity 42 (FIG. 1) as can be monitored by gauge 78. The sealant liquid passes through heat exchanger 79 where it is cooled thus providing means for cooling the seals 36 and 40. A gas cap 73 is maintained in the top of the reservoir so as to maintain pressure should some of the liquid be lost. Sight gauge 75 allows visual determination of loss of liquid and mechanical means to determine any loss could also be employed. Also, a portion of the sealant liquid passes through valve 80 (which is closed during normal operation of the reactor) to needle valve 82. Needle valve 82 is opened just enough to allow a slight flow of the sealant liquid, which acts as a lubricant in this portion of the system, via line 52 to annular passageway 50 (see FIG. 1). Generally, a pressure of 0.1 to 100 psig (10.2 to 792 KPa), preferably 10 to 50 psig (172 to 448 KPa) more preferably 20 to 40 psig (241 to 379 KPa) is used and this can be monitored by means of pressure gauge 84. The lubricant liquid flowing through annular passageway 50 eventually begins to come out to the atmosphere or to the at least essentially unpressured interior of reactor vessel 10 via generally radial passageway 54 at the impeller hub. By "at least essentially unpressured" is meant preferably at atmospheric pressure or at least not up to operating pressure, and in all events not full of operating ingredients. As soon as this happens, the motor is started and the pump shaft is operated at normal operating speed. The flow of oil through line 52 is observed by means of sight glass 86. If the new seals hold, there will be a slow constant flow through line 52. Failure of the seals will be indicated by vibration, smoking, or a surge of liquid along annular passageway 50 as a result of sealant in cavity 42 escaping. If the pump operates successfully for a matter of five minutes or so, it can be assumed with almost complete certainty that it will operate properly. Accordingly, valve 80 is then closed and excess mineral oil which has dripped into the reactor is cleaned out and the reactor reassembled and pressured up with diluent and monomer for use. Valve 70 is then opened to allow monomer or diluent flush during actual operation of the reactor.

Instead of the valving arrangement shown, it is also possible to simply connect line 88 directly to line 52 during the test and to disconnect same and connect line 90 thereto during normal operation with valve 82, gauge 84, sight gauge 86, and line 92 simply being stored during the normal operation of the apparatus. Also, as noted hereinabove, a separate source of lubricant can be utilized for supplying line 52 during the test, if desired, and this lubricant can be either the same or different from that used in the sealant system.

During normal operation, pressure within the reactor itself is generally greater than 400 psig (2.86 MPa), and is generally in the range of about 400 to 2000 psig (2.86 to 13.9 MPa), preferably 500 to 1000 psig (3.55 to 7.00 MPa), more preferably 700 to 800 psig. (4.92 to 5.61 MPa). Thus, the seal is tested with a pressure on the reactor side of the seal, which is substantially below operating pressure. That is, the reactor itself is at atmospheric pressure and the only pressure on the reactor side of the seal is the small amount produced by the lubricant liquid introduced via line 52. Without the use of this invention, the seal could not be tested without assembly the entire reactor and pressuring same up utilizing hundreds of gallons of diluent and/or monomer. The reactor cannot be operated in an open position using monomer or diluent flush since these materials would volatilize in the absence of the high reactor pressure present during actual operation.

During normal operation of the reactor, the sealant pressure on chamber 42 is generally about 1 to 100, preferably 10 to 30, psig (172 to 310 KPa) greater than the pressure in the reactor, i.e., the sealant pressure is about 400 to 2000 psig (2.86 to 13.9 MPa) preferably 500 to 1000 psig (3.55 to 7.00 MPa), more preferably 700 to 800 psig (4.92 to 5.61 MPa).

While many conventional parts have been eliminated from the drawings for the sake of simplicity, such as frame parts, electrical equipment, and the like, their inclusion is understood by those skilled in the art and is within the scope of the invention.

EXAMPLE

In a loop reactor utilized to produce propylene homopolymer utilizing liquid propylene as the sole diluent with a reactor pressure of 680 psig (4.79 MPa), the reactor was emptied of its contents in order to replace the seals. After the mechanical work was completed and the pump reassembled but with the reactor still open, the cavity between the seals was pressured to 735 psig (5.16 MPa) with white food grade mineral oil sold under the trade name ADCO grade 230. This was the same mineral oil which was used during the actual operation and was the same pressure which was used on the sealing system during actual operation. From a separate pot, the same mineral oil was introduced into the flush line to lubricate the steady bearing utilizing a sight glass as shown in FIG. 2. 30 psig (310 KPa) pressure was utilized on this line. After mineral oil began to come out of the hub end of the impeller assembly, the motor was turned on and the pump operated at the normal speed of 1800 rpm for five minutes. The pump performed satisfactorily and it was then shut off and the mineral oil cleaned out of the reactor and the reactor reassembled and pressured up to 680 psig (4.79 MPa) with propylene and the reaction begun again.

In several other instances when mechanical repairs were made to the reactor, this same procedure was followed with the same result. In two instances, there was a failure during the test and the mechanical work was repeated. In each of these instances the use of this test procedure saved approximately two days' down time.

While this invention has been described in detail for the purpose of illustration, it is not to be construed as limited thereby but is intended to cover all changes and modifications within the spirit and scope thereof.

I claim:

1. A seal test procedure comprising;
   introducing a lubricant which is liquid under test conditions into an annulus between a shaft and a surrounding sleeve, said introduction being at a point downstream of said seal, said introduction being under low pressure;
   passing said lubricant liquid along said annulus, through a downstream bearing and out to the atmosphere or the at least essentially unpressured interior of a vessel;
   maintaining a sealant liquid behind said seal under about normal operating pressure; and
   thereafter operating said shaft at about normal operating speed for a short time, and inspecting for vibration, smoking, or a surge of sealant liquid along said annulus which would indicate seal failure.

2. A method according to claim 1 wherein said lubricant liquid is introduced at a pressure of 0.1 to 100 psi and is passed out to the atmosphere, and said sealant liquid is under a pressure of 400 to 2,000 psig.

3. A method according to claim 2 wherein said lubricant liquid and sealant liquid are the same material.

4. A method according to claim 2 wherein said lubricant liquid is introduced at 10 to 50 psig and said sealant liquid is maintained under a pressure of 500 to 1000 psig.

5. A method according to claim 2 wherein said lubricant liquid is introduced at a pressure of 20 to 40 psig and said sealant liquid is maintained under a pressure of 700 to 800 psig.

6. A method according to claim 1 wherein said lubricant liquid and said sealant liquid are mineral oil and said lubricant liquid is passed out to the atmosphere.

7. A method according to claim 1 wherein said shaft operates at a speed of greater than 1000 rpm and wherein said lubricant liquid is passed out to the atmosphere.

8. A method according to claim 7 wherein said shaft is on a pump and is part of a polymerization reactor normally operated at a pressure of greater than 400 psig.

9. A method according to claim 7 wherein said sealant liquid is maintained at a pressure within the range of 700 to 800 psig.

10. A method according to claim 9 wherein said sealant liquid and lubricant are mineral oil, said sealant liquid is maintained at a pressure of 700 to 800 psig and said lubricant is introduced at a pressure of 20 to 40 psig and wherein said pump is in an olefin polymerization reactor.

11. A method according to claim 10 wherein said sealant liquid is introduced between two seals.

12. A method according to claim 1 wherein said sealant liquid is introduced between two seals.

13. A method according to claim 12 wherein said shaft is on a pump which is a part of a polymerization reactor, said lubricant liquid is passed out to the atmosphere and wherein after said test, said reactor is repressured to greater than 400 psig and operated to polymerize propylene.

* * * * *